United States Patent
Moldoveanu et al.

(10) Patent No.: US 9,766,359 B2
(45) Date of Patent: *Sep. 19, 2017

(54) MULTI-VESSEL COIL SHOOTING ACQUISITION

(71) Applicant: WESTERNGECO L.L.C., Houston, TX (US)

(72) Inventors: Nicolae Moldoveanu, Houston, TX (US); Steven Fealy, Houston, TX (US)

(73) Assignee: WESTERNGECO L.L.C., Houston, TX (US)

( * ) Notice: Subject to any disclaimer, the term of this patent is extended or adjusted under 35 U.S.C. 154(b) by 217 days.

This patent is subject to a terminal disclaimer.

(21) Appl. No.: 14/223,556

(22) Filed: Mar. 24, 2014

(65) Prior Publication Data

US 2014/0204709 A1    Jul. 24, 2014
US 2015/0043307 A9    Feb. 12, 2015

Related U.S. Application Data

(63) Continuation of application No. 12/650,268, filed on Dec. 30, 2009, now Pat. No. 8,681,580, which is a continuation-in-part of application No. 12/121,324, filed on May 15, 2008, now Pat. No. 8,559,265.

(60) Provisional application No. 61/218,346, filed on Jun. 18, 2009, provisional application No. 61/180,154, filed on May 21, 2009.

(51) Int. Cl.
*G01V 1/38*      (2006.01)
(52) U.S. Cl.
CPC .................. *G01V 1/3808* (2013.01)

(58) Field of Classification Search
CPC .................................................. G01V 1/3808
USPC ........................................................ 367/15, 20
See application file for complete search history.

(56) References Cited

U.S. PATENT DOCUMENTS

| | | |
|---|---|---|
| 2,404,440 A | 7/1946 | Holm |
| 2,465,696 A | 3/1949 | Pasley |
| 2,693,862 A | 11/1954 | Reiber |
| 2,823,375 A | 2/1958 | Camp |
| 3,283,293 A | 11/1966 | Pavey et al. |
| 3,331,050 A | 7/1967 | Kilmer et al. |
| 3,440,992 A | 4/1969 | Chance |
| 3,505,577 A | 4/1970 | Hirokawa |
| 3,506,674 A | 4/1970 | Berger |
| 3,560,912 A | 2/1971 | Spink et al. |
| 3,581,273 A | 5/1971 | Hedberg |
| 3,605,674 A | 9/1971 | Weese |
| 3,774,570 A | 11/1973 | Pearson |
| 3,806,863 A | 4/1974 | Tilley et al. |

(Continued)

FOREIGN PATENT DOCUMENTS

| | | |
|---|---|---|
| EP | 0 018053 A1 | 10/1980 |
| EP | 0 018053 B1 | 12/1983 |

(Continued)

OTHER PUBLICATIONS

PCT Search Report and Written Opinion; PCT/US2010/062419; Sep. 26, 2011.

(Continued)

*Primary Examiner* — Mark Hellner

(57) ABSTRACT

Methods for efficiently acquiring full-azimuth towed streamer survey data are described. The methods use multiple vessels to perform coil shooting.

18 Claims, 9 Drawing Sheets

(56) References Cited

U.S. PATENT DOCUMENTS

| | | | |
|---|---|---|---|
| 3,896,756 A | 7/1975 | Pearson et al. | |
| 3,921,124 A | 11/1975 | Payton | |
| 3,934,220 A | 1/1976 | Davis | |
| 3,953,827 A | 4/1976 | Le Moal et al. | |
| 4,033,278 A | 7/1977 | Waters | |
| 4,068,208 A | 1/1978 | Rice, Jr. et al. | |
| 4,074,648 A | 2/1978 | Reid et al. | |
| 4,086,504 A | 4/1978 | Ezell et al. | |
| 4,146,870 A | 3/1979 | Ruehle | |
| 4,231,111 A | 10/1980 | Neeley | |
| 4,290,124 A | 9/1981 | Cole | |
| 4,353,121 A | 10/1982 | Ray et al. | |
| 4,383,259 A | 5/1983 | Rader | |
| 4,404,664 A | 9/1983 | Zachariadis | |
| 4,468,663 A | 8/1984 | Kalt | |
| 4,486,863 A | 12/1984 | French | |
| 4,648,080 A | 3/1987 | Hargreaves | |
| 4,657,482 A | 4/1987 | Neal | |
| 4,669,067 A | 5/1987 | Roberts | |
| 4,669,097 A | 5/1987 | Bristol | |
| 4,709,355 A | 11/1987 | Woods et al. | |
| 4,729,333 A | 3/1988 | Kirby et al. | |
| 4,757,482 A | 7/1988 | Fiske, Jr. | |
| 4,803,668 A | 2/1989 | Berryhill et al. | |
| 4,834,181 A | 5/1989 | Uhri et al. | |
| 4,890,568 A | 1/1990 | Dolengowski | |
| 4,894,807 A * | 1/1990 | Alam | G01V 1/003 181/112 |
| 4,912,684 A | 3/1990 | Fowler | |
| 4,942,991 A | 7/1990 | Lyons | |
| 4,960,183 A | 10/1990 | Young, II | |
| 4,965,773 A * | 10/1990 | Marschall | G01V 1/3808 181/110 |
| 4,970,696 A | 11/1990 | Crews et al. | |
| 4,970,697 A | 11/1990 | Earley et al. | |
| 4,992,990 A | 2/1991 | Langeland et al. | |
| 4,992,991 A | 2/1991 | Young et al. | |
| 4,992,992 A | 2/1991 | Dragoset, Jr. | |
| 5,031,159 A | 7/1991 | Rouquette | |
| 5,128,904 A | 7/1992 | Chambers | |
| 5,179,905 A | 1/1993 | Hossfield et al. | |
| 5,200,930 A | 4/1993 | Rouquette | |
| 5,300,929 A | 4/1994 | MacLeod | |
| 5,329,071 A | 7/1994 | Vatne et al. | |
| 5,353,223 A | 10/1994 | Norton et al. | |
| 5,430,689 A | 7/1995 | Rigsby et al. | |
| 5,443,027 A | 8/1995 | Owsley et al. | |
| H1490 H | 9/1995 | Thompson et al. | |
| 5,508,973 A | 4/1996 | Mallick et al. | |
| 5,532,975 A | 7/1996 | Elholm | |
| 5,546,882 A | 8/1996 | Kuche | |
| 5,555,531 A | 9/1996 | Booth et al. | |
| 5,640,325 A | 6/1997 | Banbrook et al. | |
| 5,668,775 A | 9/1997 | Hatteland | |
| 5,677,893 A | 10/1997 | de Hoop et al. | |
| 5,682,357 A | 10/1997 | Rigsby | |
| 5,761,152 A * | 6/1998 | Jacobsen | G01V 1/3808 181/110 |
| 5,790,472 A | 8/1998 | Workman et al. | |
| 5,973,995 A | 10/1999 | Walker et al. | |
| 5,978,316 A | 11/1999 | Ambs et al. | |
| 6,011,752 A | 1/2000 | Ambs et al. | |
| 6,011,753 A | 1/2000 | Chien | |
| 6,028,817 A | 2/2000 | Ambs | |
| 6,044,040 A | 3/2000 | Holland | |
| 6,061,301 A | 5/2000 | Corrigan | |
| 6,144,342 A | 11/2000 | Bertheas et al. | |
| 6,175,809 B1 | 1/2001 | Naville | |
| 6,178,381 B1 | 1/2001 | Padhi et al. | |
| 6,285,956 B1 | 9/2001 | Bennett et al. | |
| 6,292,754 B1 | 9/2001 | Thomsen | |
| 6,343,256 B1 | 1/2002 | Winbow et al. | |
| 6,418,378 B1 | 7/2002 | Nyland | |
| 6,477,111 B1 | 11/2002 | Lunde et al. | |
| 6,477,711 B1 | 11/2002 | Freeman et al. | |
| 6,493,636 B1 | 12/2002 | DeKok | |
| 6,525,992 B1 | 2/2003 | Olivier et al. | |
| 6,529,832 B1 | 3/2003 | Kerekes | |
| 6,553,315 B2 | 4/2003 | Kerekes et al. | |
| 6,590,831 B1 | 7/2003 | Bennett et al. | |
| 6,629,037 B1 | 9/2003 | Nyland | |
| 6,671,223 B2 | 12/2003 | Bittleston | |
| 6,684,160 B1 | 1/2004 | Ozbek et al. | |
| 6,691,038 B2 | 2/2004 | Zajac | |
| 6,714,873 B2 | 3/2004 | Bakulin et al. | |
| 6,837,175 B1 | 1/2005 | Gieseke | |
| 6,847,896 B1 | 1/2005 | Orban et al. | |
| 6,862,531 B2 | 3/2005 | Horne et al. | |
| 6,865,487 B2 | 3/2005 | Charron | |
| 6,932,017 B1 | 8/2005 | Hillesund et al. | |
| 6,944,094 B1 | 9/2005 | Thomsen et al. | |
| 7,065,449 B2 | 6/2006 | Brewster et al. | |
| 7,080,607 B2 | 7/2006 | Hillesund et al. | |
| 7,203,130 B1 | 4/2007 | Welker | |
| 7,239,577 B2 | 7/2007 | Tenghamn et al. | |
| 7,293,520 B2 | 11/2007 | Hillesund et al. | |
| 7,377,224 B2 | 5/2008 | Ryan et al. | |
| 7,391,673 B2 | 6/2008 | Regone et al. | |
| 7,400,552 B2 | 7/2008 | Moldoveanu et al. | |
| 7,403,448 B2 | 7/2008 | Welker et al. | |
| 7,616,522 B2 | 11/2009 | Rouquette | |
| 7,660,189 B2 | 2/2010 | Vigen et al. | |
| 7,679,990 B2 | 3/2010 | Herkenhoff et al. | |
| 7,952,522 B2 | 5/2011 | Hohl | |
| 7,965,583 B2 | 6/2011 | Thomas | |
| 8,004,930 B2 | 8/2011 | Welker et al. | |
| 8,559,265 B2 | 10/2013 | Moldoveanu et al. | |
| 8,681,580 B2 * | 3/2014 | Moldoveanu | G01V 1/3808 367/15 |
| 8,681,581 B2 | 3/2014 | Mododveanu et al. | |
| 9,103,942 B2 | 8/2015 | Mododveanu et al. | |
| 2002/0193947 A1 | 12/2002 | Chamberlain | |
| 2003/0067842 A1 | 4/2003 | Sukup et al. | |
| 2003/0125878 A1 | 7/2003 | Bakulin et al. | |
| 2003/0208320 A1 | 11/2003 | Zajac | |
| 2004/0004907 A1 | 1/2004 | Austad et al. | |
| 2004/0042341 A1 | 3/2004 | Tenghamn et al. | |
| 2004/0066707 A1 | 4/2004 | Tenghamn et al. | |
| 2004/0125697 A1 | 7/2004 | Fleming | |
| 2004/0240319 A1 | 12/2004 | Carvill et al. | |
| 2005/0018537 A1 | 1/2005 | Welker et al. | |
| 2005/0180260 A1 | 8/2005 | Planke et al. | |
| 2005/0180263 A1 | 8/2005 | Lambert et al. | |
| 2005/0194201 A1 | 9/2005 | Tenghamn et al. | |
| 2006/0155476 A1 | 7/2006 | Abma | |
| 2006/0155477 A1 | 7/2006 | Matson et al. | |
| 2006/0215489 A1 | 9/2006 | Solheim et al. | |
| 2006/0227657 A1 | 10/2006 | Tveide et al. | |
| 2006/0239117 A1 | 10/2006 | Singh et al. | |
| 2006/0256653 A1 | 11/2006 | Toennessen et al. | |
| 2006/0256654 A1 | 11/2006 | Paulsen | |
| 2006/0285435 A1 | 12/2006 | Robertsson | |
| 2007/0064526 A1 | 3/2007 | Holo | |
| 2007/0104028 A1 | 5/2007 | Van Manen et al. | |
| 2007/0115757 A1 | 5/2007 | Soerli et al. | |
| 2007/0127312 A1 | 6/2007 | Storteig et al. | |
| 2007/0159921 A1 * | 7/2007 | Regone | G01V 1/3808 367/15 |
| 2007/0165486 A1 | 7/2007 | Moldoveanu et al. | |
| 2007/0274153 A1 | 11/2007 | Bisley et al. | |
| 2007/0294036 A1 | 12/2007 | Strack et al. | |
| 2008/0008032 A1 | 1/2008 | Welker | |
| 2008/0008037 A1 | 1/2008 | Welker | |
| 2008/0239875 A1 | 10/2008 | Alumbaugh et al. | |
| 2008/0253225 A1 | 10/2008 | Welker et al. | |
| 2008/0267010 A1 | 10/2008 | Moldoveau et al. | |
| 2008/0285380 A1 | 11/2008 | Rouquette | |
| 2008/0285381 A1 | 11/2008 | Moldoveanu et al. | |
| 2009/0122640 A1 | 5/2009 | Hill et al. | |
| 2009/0141587 A1 | 6/2009 | Welker et al. | |
| 2009/0231953 A1 | 9/2009 | Welker et al. | |
| 2009/0245019 A1 | 10/2009 | Falkenberg et al. | |
| 2009/0262601 A1 | 10/2009 | Hillesund et al. | |
| 2009/0296518 A1 | 12/2009 | MacNeill et al. | |

(56) References Cited

U.S. PATENT DOCUMENTS

| | | |
|---|---|---|
| 2009/0310439 A1 | 12/2009 | Hauan et al. |
| 2009/0310440 A1 | 12/2009 | Solheim et al. |
| 2009/0316525 A1 | 12/2009 | Welker |
| 2010/0013485 A1 | 1/2010 | Alumbaugh et al. |
| 2010/0027374 A1 | 2/2010 | Moldoveanu et al. |
| 2010/0118645 A1 | 5/2010 | Welker |
| 2010/0142317 A1 | 6/2010 | Moldoveanu et al. |
| 2010/0238762 A1 | 9/2010 | Hornbostel |
| 2011/0158041 A1 | 6/2011 | Moldoveanu et al. |
| 2011/0158042 A1 | 6/2011 | Moldoveanu et al. |
| 2011/0176384 A1 | 7/2011 | Soubaras |
| 2011/0260730 A1 | 10/2011 | Sudow et al. |
| 2011/0305109 A1 | 12/2011 | Soubaras |
| 2012/0092956 A1 | 4/2012 | Soubaras |
| 2012/0134234 A1 | 5/2012 | Roberts et al. |
| 2012/0213033 A1 | 8/2012 | Soubaras |
| 2013/0242695 A1 | 9/2013 | Soubaras |
| 2013/0301384 A1 | 11/2013 | Hill et al. |
| 2014/0204709 A1 | 7/2014 | Moldoveanu et al. |
| 2014/0321237 A1 | 10/2014 | Moldoveanu et al. |
| 2015/0253446 A1 | 9/2015 | Hauan et al. |
| 2015/0260868 A1 | 9/2015 | Moldoveanu et al. |

FOREIGN PATENT DOCUMENTS

| | | |
|---|---|---|
| EP | 0 321705 A2 | 6/1989 |
| EP | 0 347019 A2 | 12/1989 |
| EP | 0 562781 A2 | 9/1993 |
| EP | 0 613025 A1 | 8/1994 |
| EP | 0 613025 B1 | 9/1998 |
| EP | 0 681193 B1 | 8/1999 |
| GB | 2093610 A | 9/1982 |
| GB | 2144854 A | 3/1985 |
| GB | 2342081 A | 4/2000 |
| GB | 2390902 A | 1/2004 |
| GB | 2424949 A | 10/2006 |
| GB | 2436206 A | 9/2007 |
| WO | 84-03153 A1 | 8/1984 |
| WO | 96-21163 A1 | 7/1996 |
| WO | 97-11395 A2 | 3/1997 |
| WO | 97-30361 A1 | 8/1997 |
| WO | 97-45006 A1 | 12/1997 |
| WO | 98-28636 A1 | 7/1998 |
| WO | 00-20895 A1 | 4/2000 |
| WO | 01-29580 A1 | 4/2001 |
| WO | 2004-092771 A2 | 10/2004 |
| WO | 2005-062075 A1 | 7/2005 |
| WO | 2006-014750 A2 | 2/2006 |
| WO | 2007-070499 A2 | 6/2007 |
| WO | 2008-144492 A2 | 11/2008 |
| WO | 2010-002600 A2 | 1/2010 |
| WO | 2011/086149 A1 | 7/2011 |
| WO | 2011/086166 A | 7/2011 |
| WO | 2011/161118 A1 | 12/2011 |
| WO | 2013/019691 A1 | 2/2013 |

OTHER PUBLICATIONS

PCT Search Report and Written Opinion; PCT/US2010/035063; Dec. 29, 2010.
PCT Search Report and Written Opinion; PCT/US2009/060864; May 1, 2010.
PCT Search Report and Written Opinion; PCT/US2009/063538; Apr. 30, 2010.
PCT Search Report and Written Opinion; PCT/US2009/047015; Feb. 24, 2010.
PCT Search Report and Written Opinion; PCT/US2009/047019; Jan. 7, 2010.
PCT Search Report and Written Opinion; PCT/US2009/045261; Dec. 23, 2009.
PCT Search Report and Written Opinion; PCT/US2008/063875; Sep. 16, 2009.
UKIPO examination report (Aug. 10, 2009) and search report (Aug. 7, 2009) for GB 0912870.3.
SIPO Reexamination Notice After Final (May 4, 2014); CN 200880021257.8.
EPO Search Report (Mar. 25, 2014); EP 2010778189.0.
EPO Office Action (Dec. 4, 2013); EP 2008755677.3.
Mexican associate reporting dated Oct. 2013 for IMPI Office Action (Jul. 8, 2013); MX/a/2012/007769.
UKIPO Examination Report (Oct. 16, 2012); GB 1216841.5.
UKIPO Examination Report (Jul. 2, 2012); GB 1019201.1.
PCT Search Report and Written Opinion; PCT/US2009/031396; May 14, 2009.
IPAU Examination Report (Jun. 21, 2012); AU 2008254856.
SIPO Rejection Decision (Jun. 6, 2012) and SIPO Office Actions (Feb. 6, 2012 and Jul. 20, 2011); CN 200880021257.8.
Mexican associate reportings dated Jul. 2012, Oct. 2011, and Apr. 2011 for IMPI Office Actions; MX/a/2009/012362.
UKIPO Examination Reports (May 18, 2012 and Feb. 13, 2012); GB 1019199.7.
Mexican associate reportings dated Aug. 2012 and Mar. 2012 for IMPI Office Actions; MX/a/2010/013018.
IPAU Examination Report (May 16, 2008); AU 2006252148.
SIPO Office Action (Nov. 19, 2010); CN 200710003980.0.
UKIPO Examination Reports (Jun 8, 2010, Mar. 17, 2010, Nov. 13, 2009, Aug. 10, 2009, and Feb. 6, 2009) and UKIPO Search Report (Jul. 18, 2007); GB 0700970.9.
Mexican associate reporting dated Jun. 2009 for IMPI Office Action; PA/a/2007/000733.
Moldoveanu, et al; Full Azimuth Imaging Using Circular Geometry Acquisition; Leading Edge; vol. 27, No. 7; pp. 908-913; Jul. 2008.
Moldoveanu; "Circular Geometry for Wide-Azimuth Towed-Streamer Acquisition"; EAGE; Jun. 2008.
Hennenfent, et al.; "Simply Denoise: Wavefield Reconstructions via Jittered Undersampling"; Geophysics; vol. 73(2); pp. v19-v28; May-Jun. 2008.
Hennenfent, et al.; "Random Sampling: New Insights into the Reconstruction of Coarsely-Sampled Wavefields"; SEG Annual Meeting; pp. 2575-2579; Oct. 2007.
WesternGeco Q-Technology URL: http://www.westerngeco.com/content/services/q_technology/index.asp 2006—No Longer Exists.
Bacon, et al.; "3-D Seismic Interpretation"; Cambridge University Press; pp. 18-22 and 25-26; 2003.
Sukup; "Wide Azimuth Marine Acquisition by the Helix Method": The Leading Edge; pp. 791-794; Aug. 2002.
Pan; "Single-Sensor Towed Streamer Improves Seismic Acquisition"; Offshore; Apr. 2002.
Austad, et al.; Marine Seismic Cable Streering and Computerized Control Systems; Society of Exploration Geophysicists, Expanded Abstracts; 2000.
Bittleston, et al; Marine Seismic Cable Streering and Control; EAGE 62nd Conference and Technical Exhibition, Glasgow, Scotland; May-Jun. 2000.
Beasley, et al.; A New Look at Simultaneous Sources; SEG Expanded Abstracts; 1998.
Wong, et al.; "Sampling with Hammersley and Halton Points"; 2 Journal of Graphics Tools; pp. 9-24; 1997.
Pedersen; A Nautical Study of Towed Marine Seismic Streamer Cable Configurations; Norwegian University of Science and Technology Doctoral Thesis; 1996.
Pedersen; Active 3-D Position Control of Marine Flexible Cylinder Cables with Extremely Large Length/Diameter-Ratio; NTH Department of Marine Hydrodynamics; 1994-1995.
Reilly, et al; "Concentric Circle 3D: Optimization of Salt Diapir Flank Imaging UK Central North Sea"; First Break; vol. 12, No. 9; pp. 463-475; Sep. 1994.
Shames; Mechanics of Fluids, 3rd Ed.; McGraw-Hill; pp. 666-693; 1992.
Pedersen; A Feasibility Study of the Possibilty to Control the Horizontal Position of Seismic Streamer Cables; Division of Marine Hydrodynamics, The Norwegian Institute of Technology; Mar. 1992.
Raven; Automatic Control Engineering, 4th Ed.; McGraw-Hill; 1987.

(56) References Cited

OTHER PUBLICATIONS

Cole, et al.; "A Circular Seismic Acquisition Technique for Marine Three Dimensional Surveys"; Offshore Technology Conference, 4864; Houston, Texas; May 6-9, 1985.
Shames; Engineering Mechanics—Statics and Dynamics, 3rd Ed.; Prentice Hall; pp. 236-244; 1980.
Longobardo; Automatic Controls; Standard Handbook for Mechanical Engineers; pp. 16-33 through 16-34; 1967.
Lee; An Algorithm for Path Connections and its Applications; IRE Transcations on Electronic Computers; pp. 346-365; Sep. 1961.
Kalman; A New approach to Linear Filtering and Prediction Problems; Trans of ASME—Journal of Basic Engineering; vol. 82 (Series D); pp. 35-45; 1960.
Examination report for the equivalent Australian patent application No. 2015203555 issued on Apr. 6, 2016, 4 pages.
Communication pursuant to Art 94(3) EPC for the equivalent European patent application No. 10778189.0 issued on Sep. 6, 2016, 4 pages.
Examination report for the equivalent Australian patent application No. 2015203555 issued on Nov. 2, 2016, 3 pages.
Brink M., et al., "Wide Tow Marine Seismic Surveys: Parallel or Opposite Sail Lines," Offshore Technology Conference, May 1997.
Cole, R. "Three dimensional marine seismic data acquisition using controlled streamer feathering," SEG Conference in 1988.
Moldoveanu, et al., "What is the Next Step After WAZ for Exploration in the Gulf of Mexico," SEG Houston International Exposition and Annual Meeting, pp. 41-45 2009.
Philip M. Fontana, "Wide-Azimuth Towed Streemer acquisition offers a bright future for finding new reserves in complex geologic settings," E&P Global Exploration & Production News, CGGVeritas, 3 pages.
Qin, et al. "An Overview of Industrial Model Predictive Control Technology," 1996 at http://www.che.utexas.edu/~qin/cpcv/cpcv14.html retrieved Dec. 28, 2006.
"Wide-Tow Streamer 3D Acquisition: Fundamentals," Tech Link PGS Geophysical, vol. 5, No. 6, Aug. 2015.

\* cited by examiner

MULTI-VESSEL COIL SHOOTING ACQUISITION

CROSS-REFERENCE TO RELATED APPLICATIONS

This application is a continuation of U.S. patent application Ser. No. 12/650,268 filed Dec. 30, 2009, now U.S. Pat. No. 8,681,580 issued Mar. 25, 2014; which is a continuation in part of U.S. patent application Ser. No. 12/121,324 filed May 15, 2008, now U.S. Pat. No. 8,559,265 issued Oct. 15, 2013. This continuation application also claims the benefit of U.S. Provisional Patent Application Ser. Nos. 61/218,346 filed Jun. 18, 2009 and 61/180,154 filed May 21, 2009. All of these applications are incorporated herein by reference in their entireties.

BACKGROUND OF THE INVENTION

1. Field of the Invention

The present invention relates to the field of marine survey data acquisition methods. More specifically, the invention relates to methods for acquiring high quality long-offset, full-azimuth survey data.

2. Description of the Related Art

The performance of a marine seismic acquisition survey typically involves one or more vessels towing at least one seismic streamer through a body of water believed to overlie one or more hydrocarbon-bearing formations. WesternGeco L.L.C. currently conducts high-resolution Q-Marine™ surveys, in some instances covering many square kilometers. In many areas of the world hydrocarbon reservoirs located in structurally complex areas may not be adequately illuminated even with advanced towed marine streamer acquisition methods.

For example, the shallow, structurally complex St. Joseph reservoir off Malaysia produces oil and gas in an area that poses many surveying and imaging challenges. Strong currents, numerous obstructions and infrastructure, combined with difficult near-surface conditions, may hinder conventional survey attempts to image faults, reservoir sands, salt domes, and other geologic features.

A survey vessel known as a Q-Technology™ vessel may conduct seismic surveys towing multiple, 1000-10,0000-meter cables with a separation of 25-50 meters, using the WesternGeco proprietary calibrated Q-Marine™ source. "Q" is the WesternGeco proprietary suite of advanced seismic technologies for enhanced reservoir location, description, and management. For additional information on Q-Marine™, a fully calibrated, point-receiver marine seismic acquisition and processing system, as well as Q-Land™ and Q-Seabed™, see http://www.westerngeco.com/q-technology.

To achieve high density surveys in regions having a combination of imaging and logistical challenges, a high trace density and closely spaced streamers may be used. However, this presents the potential of entangling and damaging streamer cables and associated equipment, unless streamer steering devices are closely monitored and controlled. Wide-azimuth towed streamer survey data is typically acquired using multiple vessels, for example: one streamer vessel and two source vessels; two streamer vessels and two source vessels; or one streamer vessel and three source vessels. Many possible marine seismic spreads comprising streamers, streamer vessels, and source vessels may be envisioned for obtaining wide- or rich-azimuth survey data.

Assignee's co-pending application Ser. No. 11/335,365, filed Jan. 19, 2006, discusses some of these. This document discusses shooting and acquiring marine seismic data during turns of linear marine surveys and during curvilinear paths. While an advance in the art, the art continues to seek improvements to marine seismic data acquisition techniques.

Cole et al., "A circular seismic acquisition technique for marine three dimensional surveys," Offshore Technology Conference, OTC 4864, May 6-9, 1985, Houston, Tex., described a concentric circle shooting scheme for obtaining three dimensional marine survey data around a sub-sea salt dome. While perhaps useful when the location of the feature is known, this technique would not be efficient or productive for finding new oil and gas deposits, or for monitoring changes in same if such information is desired.

A great leap in acquisition technology was described in another assignee's co-pending application Ser. No. 12/121,324, filed on May 15, 2008. This reference describes methods for efficiently acquiring wide-azimuth towed streamer seismic data, which is also known as the "coil shooting" technique.

While the Q suite of advanced technologies for marine seismic data acquisition and processing may provide detailed images desired for many reservoir management decisions, including the ability to acquire wide- and/or rich azimuth data, the ability to acquire higher quality marine seismic data with less cost, or to increase the fold while also increasing the diversity of azimuth and offset, are constant goals of the marine seismic industry and would be viewed as advances in the art.

SUMMARY OF THE INVENTION

In a first aspect, a method of acquiring full-azimuth survey data comprises: deploying a first marine vessel towing at least one source and one receiver streamer swath; and deploying a second marine vessel towing at least one source; wherein the first marine vessel and second marine vessel travel along generally curved advancing paths while acquiring survey data.

In a second aspect, a method, comprises: deploying a towed array marine seismic survey spread including: a seismic receiver array; and conducting a multi-vessel, coil shooting, towed array marine seismic survey. The seismic survey spread includes at least two seismic sources; and a plurality of survey vessels towing the seismic receiver array and the seismic sources.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which.

Figure 1:
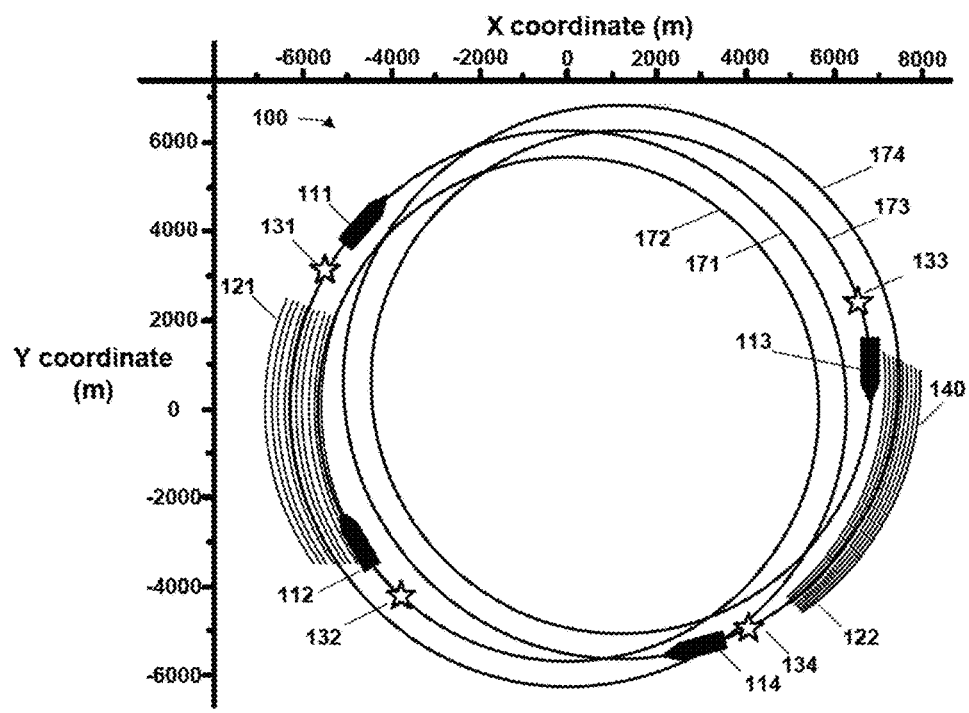
FIG. 1 conceptually illustrates in a "bird's eye" view one particular embodiment of a multi-vessel towed array, marine seismic survey using a coil shoot implemented in accordance with one aspect of the present invention.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In the following description, numerous details are set forth to provide an understanding of the present invention. However, it will be understood by those skilled in the art that the present invention may be practiced without these details and that numerous variations or modifications from the described embodiments may be possible. For example, in the discussion herein, aspects of the invention are developed within the general context of acquiring high quality marine seismic data in a more cost efficient manner, which may employ computer-executable instructions, such as program modules, being executed by one or more conventional computers. Generally, program modules include routines, programs, objects, components, data structures, etc., that perform particular tasks or implement particular abstract data types.

Moreover, those skilled in the art will appreciate that the invention may be practiced in whole or in part with other computer system configurations, including hand-held devices, personal digital assistants, multiprocessor systems, microprocessor-based or programmable electronics, network PCs, minicomputers, mainframe computers, and the like. In a distributed computer environment, program modules may be located in both local and remote memory storage devices. It is noted, however, that modification to the systems and methods described herein may well be made without deviating from the scope of the present invention. Moreover, those skilled in the art will appreciate, from the discussion to follow, that the principles of the invention may well be applied to other aspects of seismic data acquisition. Thus, the systems and method described below are but illustrative implementations of a broader inventive concept.

The present invention relates to methods for efficiently acquiring marine seismic data, wherein efficiency may be defined as more cost effective in that less seismic resources are used. It also provides improved seismic imaging using minimal marine seismic equipment (only one vessel is required, although an additional source vessel may be used, as explained more fully herein). Furthermore, a richer azimuth survey can be acquired than what is acquired with systems and methods employed to date that are based on parallel acquisition geometry concept.

The systems and methods of the invention may be particularly adept at acquiring wide- and/or rich azimuth marine seismic data, and acquiring such data while traversing generally curved advancing paths, which may be characterized as coil patterns or paths. When viewed in plan view, certain paths useful in the invention may resemble overlapping circles, as in a flattened coil. The time to shoot a survey may be longer with the inventive methods compared to traditional linear surveys. If the same survey can be acquired with a four vessel configuration sailing generally parallel the total time required may be shorter; however the total cost is higher for multiple vessel marine seismic data acquisition, and multiple vessels are not always available.

A distinct feature of the inventive methods is that the azimuth is changing from shot to shot. This excludes redundancy in the azimuths acquired, whereas conventional marine acquisition is based on parallel acquisition geometry and this implies azimuth redundancy. A wider azimuth range can be acquired with parallel geometry by adding extra vessels or by repeating the survey with different cross-line offsets, however both of these options add to the cost of the seismic survey.

Other possible benefits of methods of the present invention include:
- a line change is required only for data management reasons, otherwise the survey may be acquired continuously;

high efficiency data acquisition: the line change is in the order of few minutes;
the azimuths are different from shot to shot;
rich azimuth- and offset distribution data is collected;
very high fold is acquired;
coil shooting methods of the invention are less sensitive to currents;
no infill or a minimum amount of infill is required;
the coil shooting methods are less sensitive to seismic interferences;
the effect of perturbations due to the obstructions may be less than for multiple-vessel, linear wide-azimuth acquisition; and
the methods offer improved reservoir illumination (including, but not limited to, sub-salt reservoir illumination) and more effective coherent noise attenuation due to the high variability of azimuths.

Note that not all embodiments will necessarily exhibit all of the benefits discussed herein. To the extent that various embodiments manifest some of the benefits, not all of them will exhibit them to the same degree.

A rich- or wide-azimuth towed streamer survey may be acquired in accordance with the present invention using a single streamer vessel comprising multiple streamers and a minimum of one source array. In certain embodiments the methods include positioning of streamers and/or sources employing positioning apparatus or systems (for example satellite-based systems), one or more streamer steering devices, one or more source array steering devices, and/or one or more noise attenuation apparatus or systems. One system, known as Q-Marine™ includes these features and may be useful in methods of the invention.

The coil shooting is generally described in more detail in assignee's co-pending U.S. application Ser. No. 12/121,324, filed on May 15, 2008, which is incorporated herein by reference in its entirety. Note, however, that the embodiments disclosed therein are single vessel techniques. Single vessel coil shooting is a very economical and efficient way of acquiring full-azimuth survey data. But the offset among the data may be limited by the lengths of the streamers.

Figure 6:
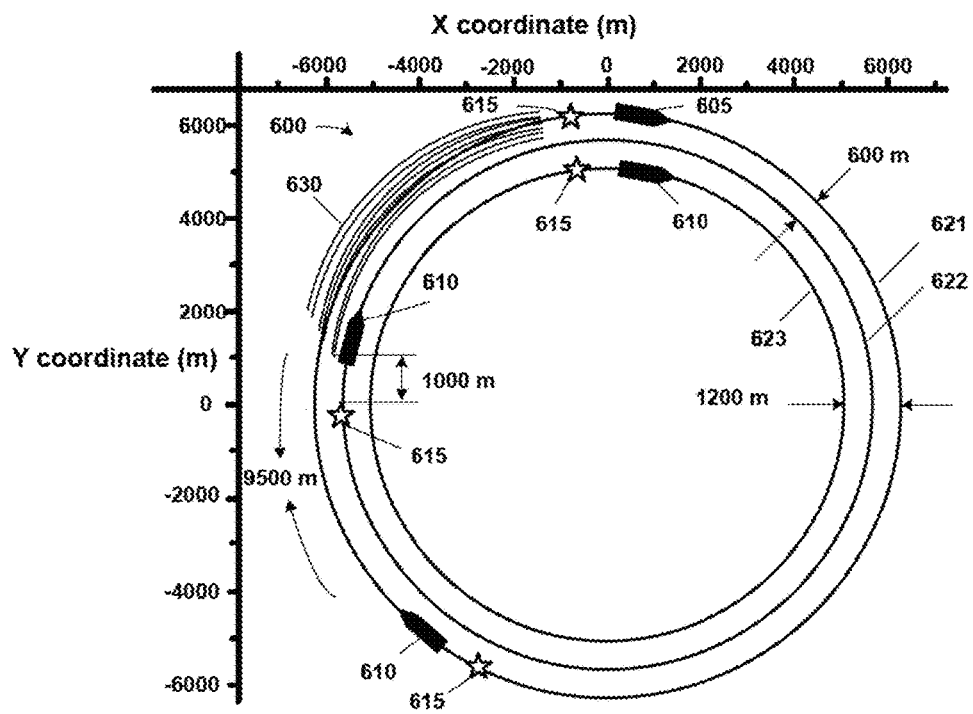
FIG. 6 conceptually illustrates in a "bird's eye" view a second embodiment of a multi-vessel towed array, marine seismic survey using a coil shoot implemented in accordance with one aspect of the present invention.
Figure 8:
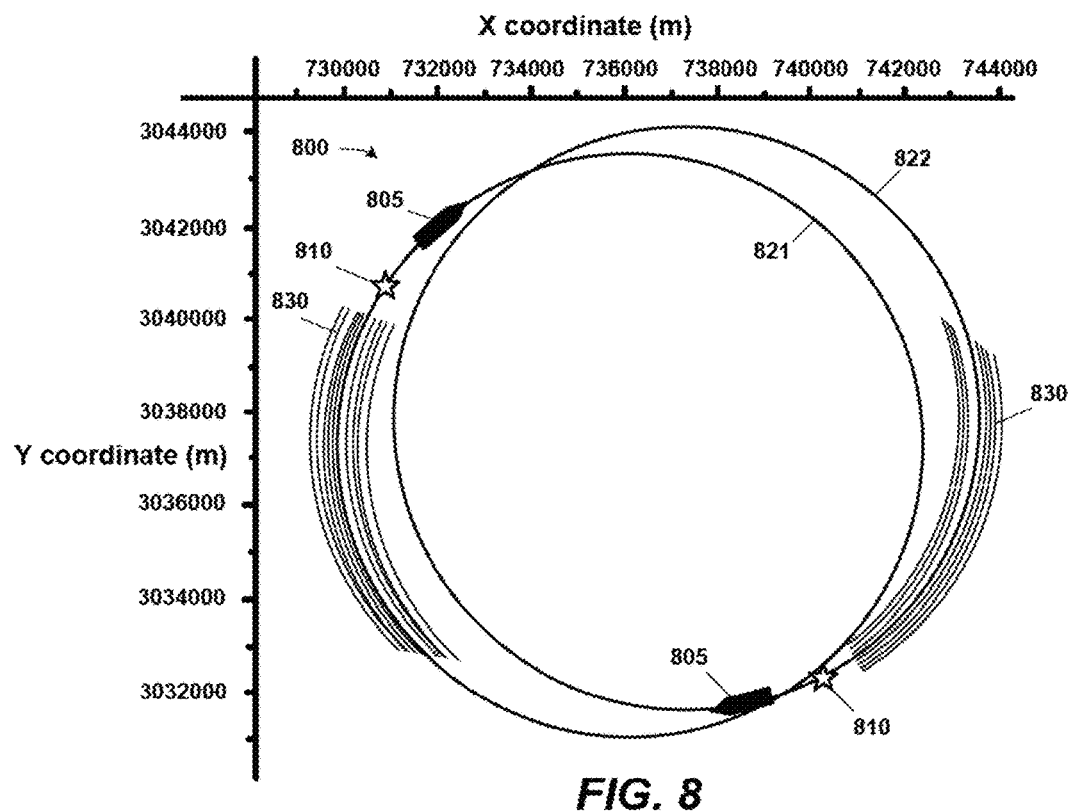
FIG. 8 conceptually illustrates in a "bird's eye" view a second embodiment of a multi-vessel towed array, marine seismic survey using a coil shoot implemented in accordance with one aspect of the present invention.

For acquisition of long offset data, improved efficiency and better distribution of shots, multi-vessel methods as described below may be used. Multi-vessel configuration can be used to acquire coil shooting data. Examples of multi-vessel configuration that can be used for coil shooting are:

2 receiver vessels and two source vessels or 2×4, depicted in FIG. 1;
1 receiver vessel and three source vessels or 1×4, shown in FIG. 6; and
two receiver vessels (dual coil) or 2×2, depicted in FIG. 8.

Each of these embodiments will be discussed further below.

Turning now to the drawings, FIG. 1 conceptually illustrates one particular embodiment of a multi-vessel, towed array, marine seismic survey spread 100 implemented in accordance with one aspect of the present invention. The spread 100 comprises four survey vessels 111-114, two streamer arrays 121-122, and a plurality of sources 131-134. The vessels 111, 114 are "receiver vessels" in that they each tow a respective one of the streamer arrays 121, 122, although they also tow a respective source 131, 134. Because they also tow the sources 131, 134, the receiver vessels 111, 114 are sometimes called "streamer/source" vessels or "receiver/source" vessels. In some embodiments, the receiver vessels may omit the sources 131, 134. In such embodiments, the receiver vessels are sometimes called "streamer only" vessels because they only tow streamers. The vessels 112-113 are "source vessels" in that they each tow a respective source or source array 131-135 but no streamer arrays, that is they two the seismic sources 132-133 to the exclusion of any streamer arrays. The vessels 112-113 are therefore sometimes called "source only" vessels.

Each streamer array 121, 122 comprises a plurality of streamers 140 (only one indicated). The present invention admits wide variation in the implementation of the streamers 140. As will be discussed further below, the streamers 140 are "multicomponent" streamers as will be discussed further below. Examples of suitable construction techniques may be found in U.S. Pat. No. 6,477,711, U.S. Pat. No. 6,671,223, U.S. Pat. No. 6,684,160, U.S. Pat. No. 6,932,017, U.S. Pat. No. 7,080,607, U.S. Pat. No. 7,293,520, and U.S. application Ser. No. 11/114,773, incorporated by reference below. Any of these alternative multicomponent streamers may be used in conjunction with the presently disclosed technique. However, the invention is not limited to use with multicomponent streamers and may be used with conventional, pressure-only streamers used in 2D surveys.

Figure 2A:
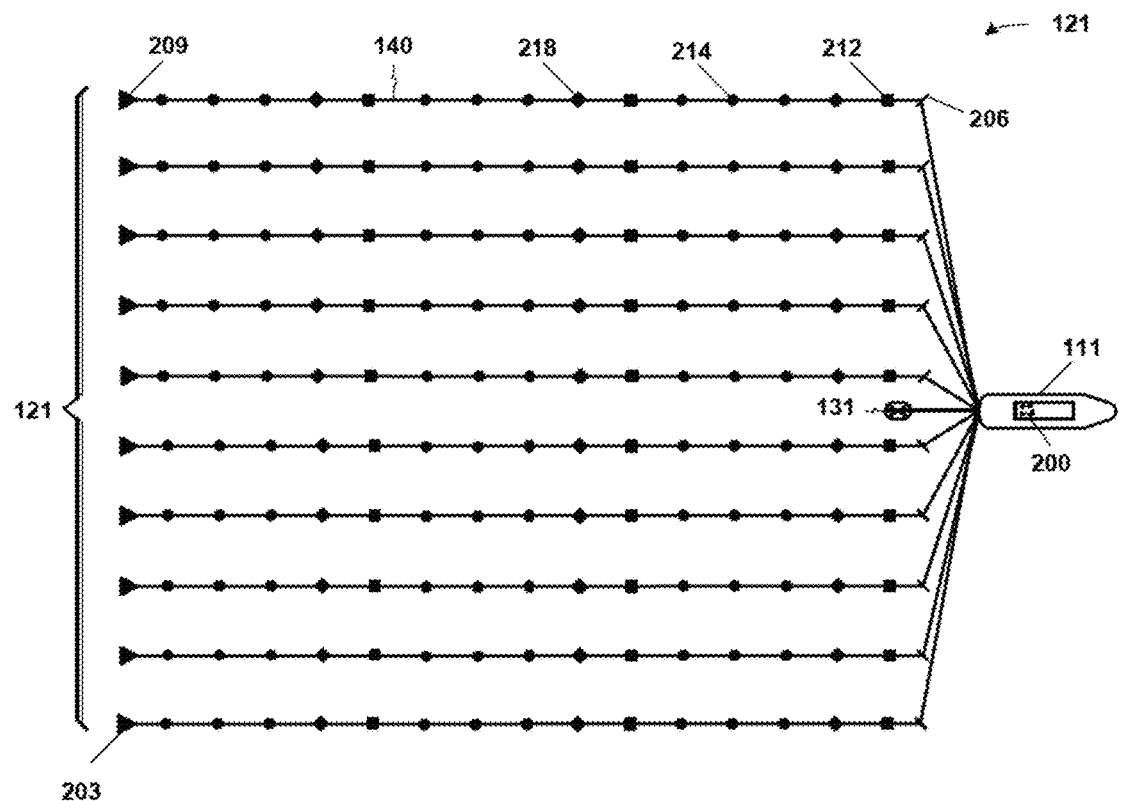
FIG. 2A-FIG. 2B depict selected spread elements of the spread first shown in FIG. 1 of a streamer array first shown in FIG. 1, including a streamer survey vessel, a plurality of streamers, seismic sensors, and a seismic source in a plan, overhead view.
Figure 2B:
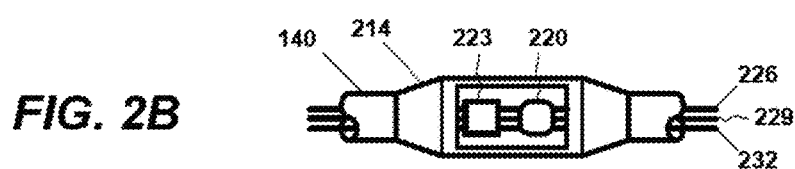

To further an understanding of the present invention, one particular embodiment of the streamer arrays will now be disclosed with respect to FIG. 2A-FIG. 2B. FIG. 2A depicts one particular embodiment of the survey vessel 111, streamer array 121, and seismic source 131 in a plan, overhead view. On board the survey vessel 111 is a computing apparatus 200. The computing apparatus 200 controls the streamer array 121 and the source 131 in a manner well known and understood in the art. The towed array 121 comprises ten streamers 140 (only one indicated). The number of streamers 140 in the towed array 121 is not material to the practice of the invention. These aspects of the apparatus may be implemented in accordance with conventional practice.

At the front of each streamer 140 is a deflector 206 (only one indicated) and at the rear of every streamer 140 is a tail buoy 209 (only one indicated) used to help control the shape and position of the streamer 140. Located between the deflector 206 and the tail buoy 209 are a plurality of seismic cable positioning devices known as "birds" 212. In this particular embodiment, the birds 212 are used to control the depth at which the streamers 140 are towed, typically a few meters.

The streamers 140 also include a plurality of instrumented sondes 214 (only one indicated) distributed along their length. The instrumented sondes 214 house, in the illustrated embodiment, an acoustic sensor 220 (e.g., a hydrophone) such as is known to the art, and a particle motion sensor 223, both conceptually shown in FIG. 2B. The particle motion sensors 223 measure not only the magnitude of passing wavefronts, but also their direction. The sensing elements of the particle motions sensors may be, for example, a velocity meter or an accelerometer.

The sensors of the instrumented sondes 214 then transmit data representative of the detected quantity over the electrical leads of the streamer 140 to the computing apparatus 200. The streamer 140 in this particular embodiment provides a number of lines (i.e., a power lead 226, a command and control line 229, and a data line 232) over which signals may be transmitted. Furthermore, the streamer 140 will also typically include other structures, such as strengthening members (not shown), that are omitted for the sake of clarity.

The inline separation of the streamer components and the crossline separation of the streamers will be determined in accordance with techniques well known in the art in view of implementation specific requirements for the survey to be conducted.

Returning to FIG. 1, the sources 131-134 typically will be implemented in arrays of individual sources. The sources 131-134 may be implemented using any suitable technology known to the art, such as impulse sources like explosives, air guns, and vibratory sources. One suitable source is disclosed in U.S. Pat. No. 4,657,482, incorporated by reference below. The embodiment illustrated in FIG. 1 simultaneously shoots several of the sources 131-134. Accordingly, care should be taken so that the sources 131-137 can be separated during subsequent analysis. There are a variety of techniques known to the art for source separation and any such suitable technique may be employed. Source separation may be achieved by a source encoding technique in which one source is coherent and another source is incoherent in a certain collection domain, such as common depth point, common receiver or common offset. Another way source separation technique is disclosed in C. Beasley & R. E. Chambers, 1998, "A New Look at Simultaneous Sources," 60$^{th}$ Conference and Exhibition, EAGE, Extended Abstracts, 02-38.

Figure 3A:
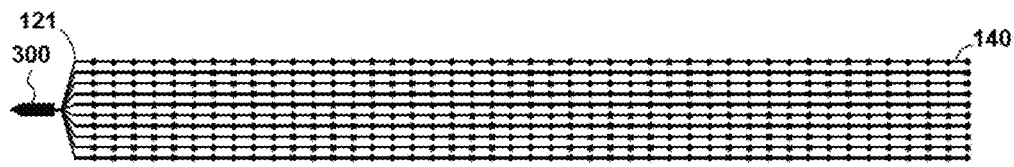
FIG. 3A-FIG. 3B depict a streamer only survey vessel and a source only survey vessel, respectively, such as may be used in some aspects of various embodiments.
Figure 3B:

As was noted above, some receiver vessels (e.g., "streamer only" vessels or "receiver only" vessels) may omit the sources 131, 134 and the source vessels 112-113 tow only sources. FIG. 3A illustrates a receiver only vessel 300 and FIG. 3B illustrates a source only vessel 310 towing a seismic source 312.

The relative positions of the vessels 111-114 described above, as well as the shape and depth of the streamers 140, may be maintained while traversing the respective sail lines 171-174 using control techniques known to the art. Any suitable technique known to the art may be used. Suitable techniques includes those disclosed in U.S. Pat. No. 6,671,223, U.S. Pat. No. 6,932,017, U.S. Pat. No. 7,080,607, U.S. Pat. No. 7,293,520, and U.S. application Ser. No. 11/114,773, incorporated by reference below.

The illustrated embodiment uses WesternGeco Q-Marine technology that provides features such as streamer steering, single-sensor recording, large steerable calibrated source arrays, and improved shot repeatability, as well as benefits such as better noise sampling and attenuation, and the capability to record during vessel turns, all contribute to the improved imaging. More particularly, each of the vessels 111-114 is a Q™ vessel owned and operated by WesternGeco, the assignee hereof. Each vessel 111-114 is provided with a GPS receiver coupled to an integrated computer-based seismic navigation (TRINAV™), source controller (TRISOR™), and recording (TRIACQ™) system (collectively, TRILOGY™), none of which are separately shown. The sources 131-134 are typically TRISOR™-controlled multiple air gun sources.

The above is but one exemplary embodiment. The spread 100 may be implemented using any technology suitable to the art. The one caveat is that the spread controllers in the spread must be capable of controlling the position of the spread elements during the acquisition described below. One advantage of using the Q-Marine technology is that it provides superior control relative to most other implementations in the art.

Figure 4:
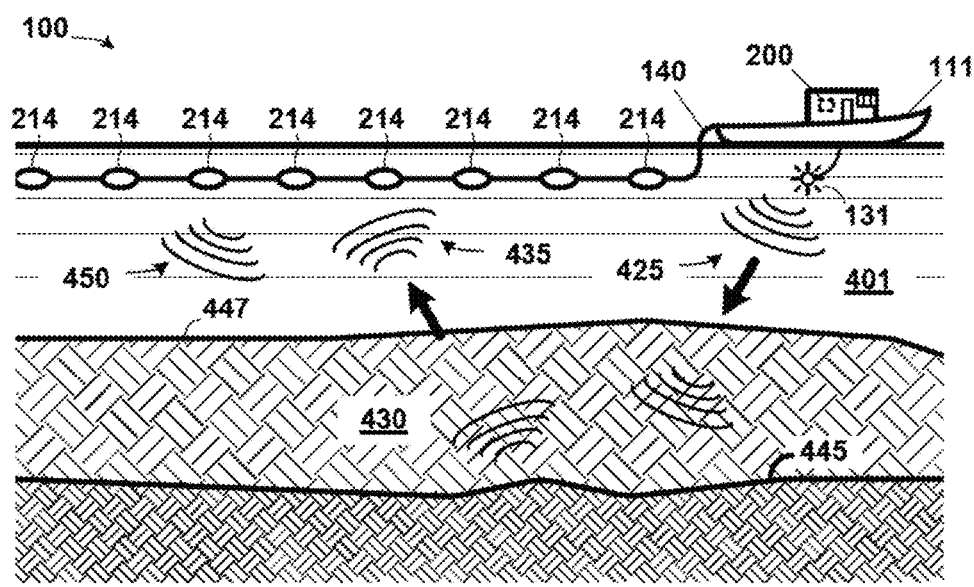
FIG. 4 illustrates selected portions of the survey first shown in FIG. 1.

FIG. 4 is a "snapshot" during the acquisition described above for the vessel 111 as it traverses its respective sail line 171. For the sake of clarity, and so as not to obscure this aspect of the invention, some detail is omitted. For example, only the receiver vessel 111, streamer array 121, and source 131 are shown because the operation of the other spread elements can readily be extrapolated therefrom. Some elements of the streamer 140, namely the positioning devices, are likewise omitted for the same reason.

FIG. 4 also shows a subterranean geological formation 430. The geological formation 430 presents a seismic reflector 445. As those in the art having the benefit of this disclosure will appreciate, geological formations under survey can be much more complex. For instance, multiple reflectors presenting multiple dipping events may be present. FIG. 4 omits these additional layers of complexity for the sake of clarity and so as not to obscure the present invention.

Still referring to FIG. 4, the seismic source 131 generates a plurality of seismic survey signals 425 in accordance with conventional practice as the survey vessel 111 tows the streamers 140 across the area to be surveyed in predetermined coil pattern described above. The seismic survey signals 425 propagate and are reflected by the subterranean geological formation 430. The receivers 214 detect the reflected signals 435 from the geological formation 430 in a conventional manner. The receivers 214 then generate data representative of the reflections 435, and the seismic data is embedded in electromagnetic signals.

The signals generated by the receivers 214 are communicated to the data collection unit 200. The data collection unit 200 collects the seismic data for subsequent processing. The data collection unit 200 may process the seismic data itself, store the seismic data for processing at a later time, transmit the seismic data to a remote location for processing, or some combination of these things.

Figure 5:
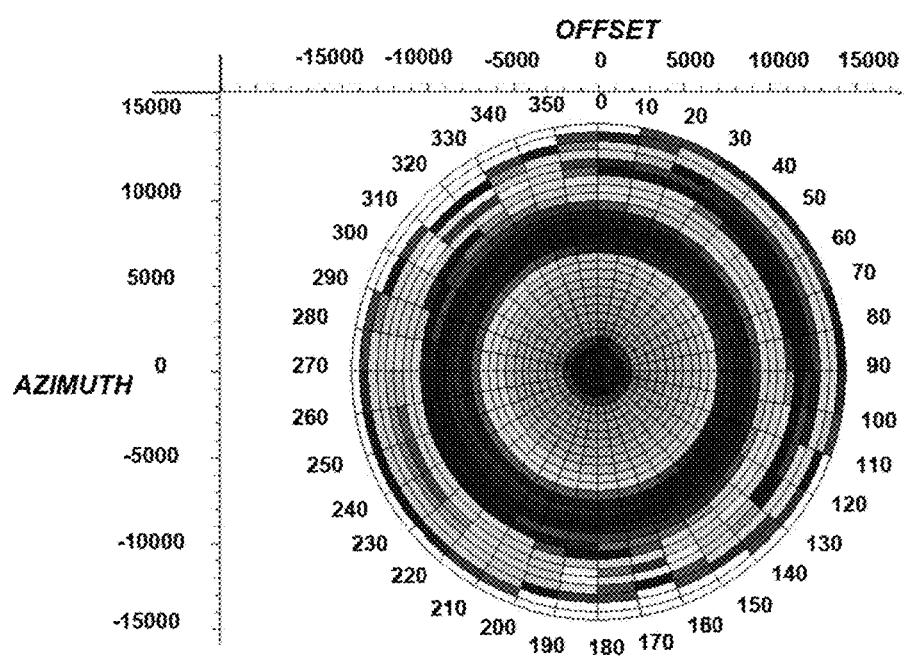
FIG. 5 is the offset-azimuth distribution for data acquired in the embodiment of FIG. 1.

The survey of FIG. 1 is a wide-azimuth survey. The offset-azimuth plot for this survey is illustrated in FIG. 5.

Figure 7:
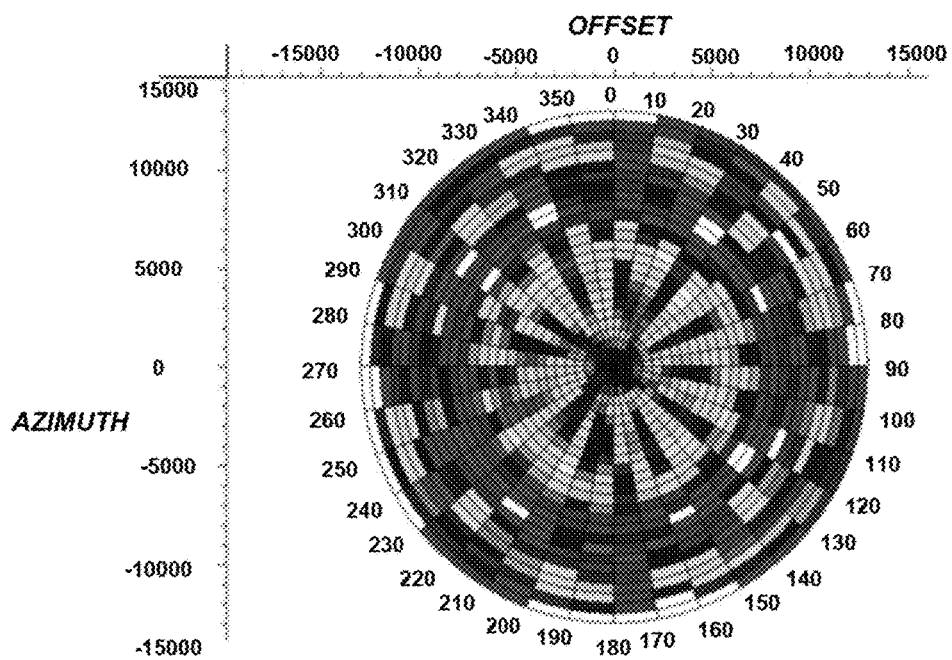
FIG. 7 is the offset-azimuth distribution for data acquired in the embodiment of FIG. 6.

The invention admits variation in its implementation of not only the spread elements, but the spread itself and the design of the survey. FIG. 6 depicts an alternative embodiment 600 employing a single receiver vessel 605 and three source vessels 610. Note that, in this embodiment, all the vessels 605, 610 tow a source 615 while only the receiver vessel 605 tows a streamer array 630. The offset-azimuth plot for the embodiment 600 is shown in FIG. 7. Note that the sail lines 621-623, shown in FIG. 6, form three concentric circles. This may be referred to as a 1×4 coil shoot because there is one streamer array and four sources.

Figure 9:
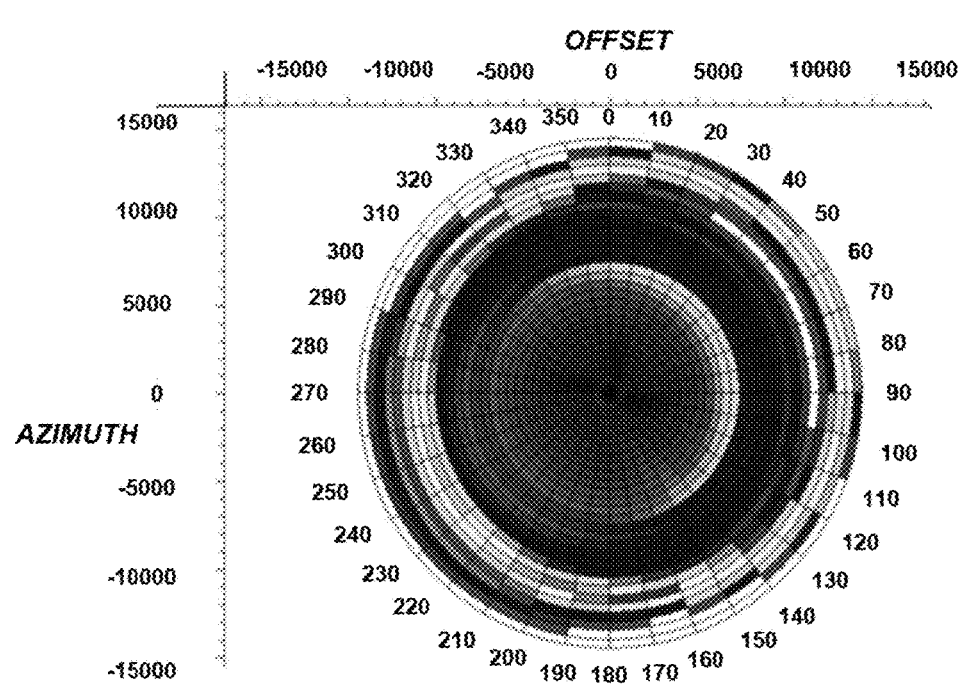
FIG. 9 is the offset-azimuth distribution for data acquired in the embodiment of FIG. 8.
Figure 10:
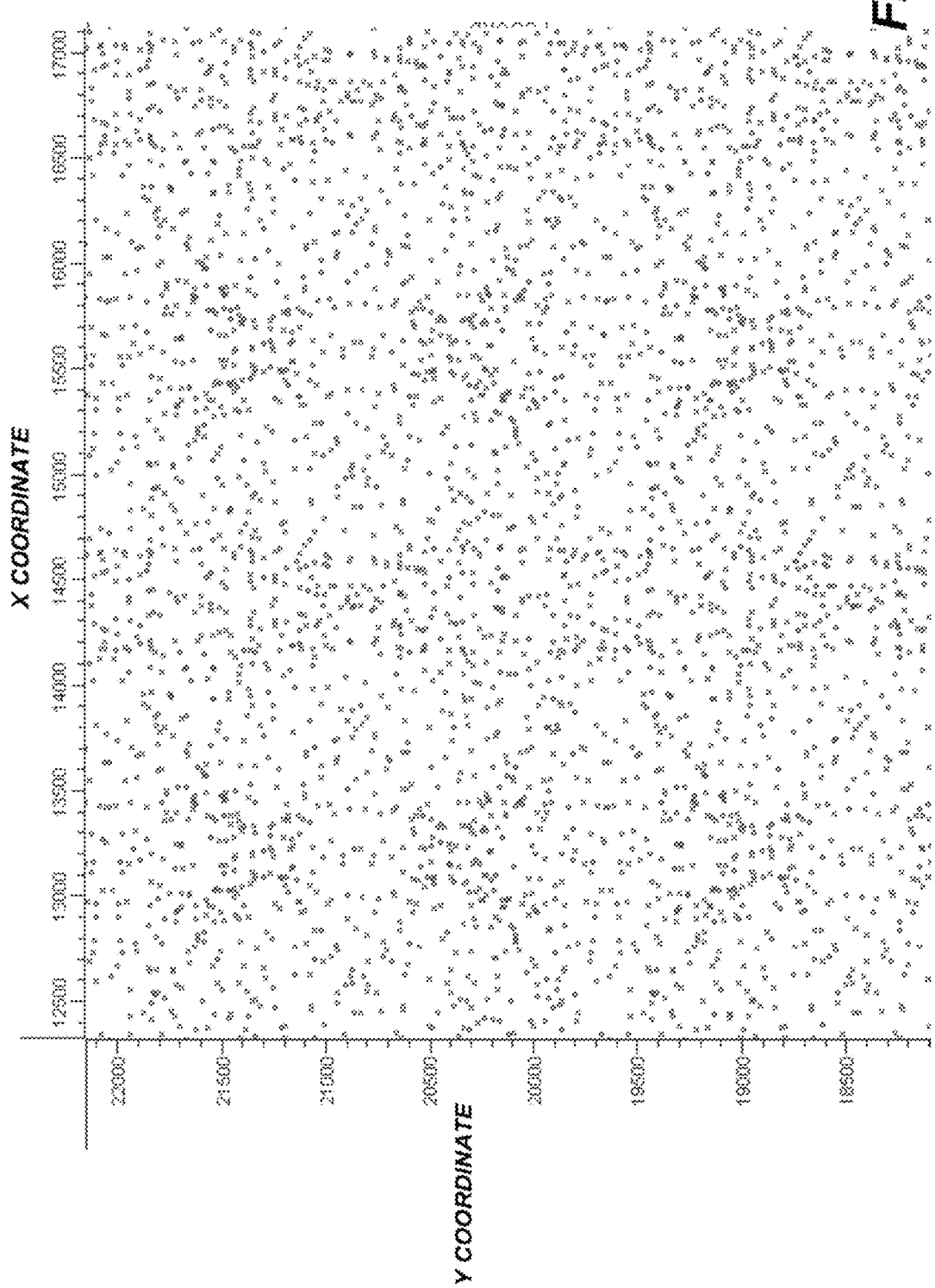
FIG. 10 is an exemplary from a simulation of the embodiment of FIG. 1.

FIG. 8 depicts a third embodiment 800 using two receiver vessels 805, each towing a respective source 810 and a respective streamer array 830, on offset sail lines 821-822. This is a "dual coil" pattern, or a 2×2 coil shoot. The offset-azimuth plot for the embodiment 800 is shown in FIG. 9. Still other alternative embodiments may become apparent to those skilled in the art.

Multi-vessel coil shooting such as that described above provides collection of longer offsets and improved efficiency. From the offset-azimuth diagrams presented in FIG. 5, FIG. 7, and FIG. 9, one can see that offsets longer than 12 km and full azimuth can be acquired. Multi-vessel coil shooting also allows larger interval between circles than does single vessel coil shooting. For instance, if for single vessel coil shooting the interval between circles (circle roll) is 1200 m, for dual coil shooting acquisition the circle roll could be 1800 m in x and y directions, and this will reduce the total number of days for the acquisition.

As will be apparent to those skilled in the art from the disclosure herein, the shot distribution from multi-vessel coil shooting is not along one single circle as in single vessel coil shooting, but along multiple circles. The maximum number of circles is equal to the number of vessels. The pattern of shot distribution is nearly random and this is a benefit for imaging and multiple attenuation. An example of shot distribution from simulation of a 2×2 coil shooting acquisition is presented in FIG. 9.

In each of FIG. 1, FIG. 6, and FIG. 8, only a single set of sail lines is shown. Those in the art will appreciate that the survey areas are typically rather larger, and that a single set of sail lines will be insufficient to cover an entire survey area. Accordingly, preparation for the survey will typically involve the planning of multiple, circular sail lines. This can be adapted from techniques used in single vessel coil shooting as disclosed in U.S. application Ser. No. 11/335,365, filed Jan. 19, 2006, and incorporated below.

Design parameters for multi-vessel coil shooting include: the number of streamers; the streamer separation; the streamer length; the circle radius, the circle roll in X and Y directions; the number of vessels; and the relative location of the vessels relative to a master vessel. These parameters are selected to optimize: data distribution in offset-azimuths bins or in offset-vector tiles; and cost efficiency. Those skilled in the art having the benefit of this disclosure will appreciate that these factors can be combined in a number of ways to achieve the stated goals depending upon the objective of and the constraints on the particular survey. Their application will therefore be implementation specific.

As noted above, one particular consideration in a multi-vessel coil shoot is how the vessels are positioned relative to a master vessel. The master vessel is one of the streamer vessels. One factor in this consideration is the position of the source vessel relative to the streamer vessel; in FIG. 1, the source vessels were placed behind the streamer vessels; this arrangement will generate positive and negative offsets (or "split-spread" type data). Other factors include the circle radii of the source vessels and the position of the second streamer vessel vs. the master vessel. The offset and azimuth distribution for multivessels coil shooting is determined d by these factors.

Figure 11A:
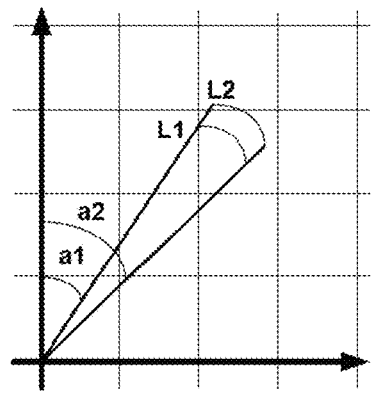
FIG. 11A-FIG. 11C illustrate design considerations for use in planning a multi-vessel coil shoot.
Figure 11B:
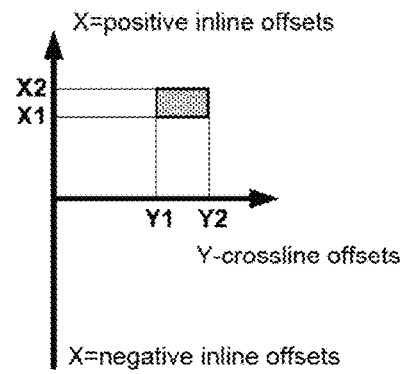
Figure 11C:
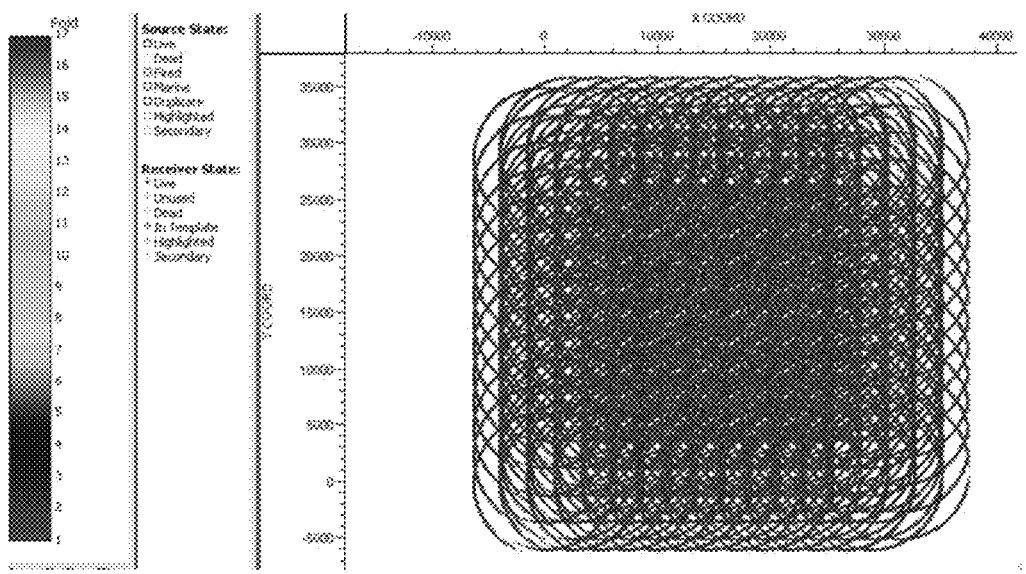

To speed up the acquisition for a coil shoot, one may use two streamer vessels separated by certain distance. However, we do not have the benefit of a wider footprint and offset-azimuth distribution that is acquired with multivessel acquisition. Also, single vessel acquisition can use also an additional source vessel but this is mostly used to undershoot isolated obstructions FIG. 11A-FIG. 11B show how the offset azimuth bins and offset-vector tiles are defined. The objective of survey design is to have a uniform data distribution that will allow applying the appropriate processing sequence in these domains. FIG. 11C shows an example of data distribution for an offset range of 400 m to 600 m and azimuth range 0-45° for a 2×4 coil shooting acquisition.

Multi-vessel coil shooting allows more flexibility in survey design than a single vessel coil shooting. Depending on the survey objectives, i.e., if the survey is a reservoir development type or an exploration type survey the roll interval can vary. For an exploration type survey the roll interval is larger than the roll interval for a development type survey due to the fact that for multi-vessel coil shooting the shots are distributed on several circles and this generates a larger subsurface footprint, which allows to increase the roll interval. In this way the data density and the cost-efficiency could be balanced to accommodate the survey objectives.

Table-1 shows a comparison between a single coil shooting survey, a dual coil shooting survey and a 2×4 coil shooting survey in terms of roll interval in X and Y directions, data density and total number of days required to acquire a survey that covers an area of 30 km×30 km. The number of days represents 100% production time.

TABLE 1

Comparison Between Different Coil Shooting Design Options & 2 × 4 RAZ for an area of 30 km × 30 km

| Configuration | Roll | No. of Circles | No. of Shots | No. of Days |
|---|---|---|---|---|
| Single Coil | 1400 m | 484 | 507,232 (5,600 tr/s) | 103 |
| Dual Coil | 1800 m | 256 | 268,288 (11,200 tr/s) | 55 |
| 2 × 4 coil | 2400 m | 169 | 177,112 (112,200 tr/s) | 37 |

Most towed marine streamers are used in seismic surveys. The towed marine streamers may also be used in other types of surveys, for example, Controlled Sources Electromagnetic surveys ("CSEM"). In a CSEM survey at least one "vertical" electromagnetic (EM) source is towed by a marine vessel. EM receivers are also towed by either the same marine vessel or by a different marine vessel. In this manner, the EM source is towed along with the EM receivers through a body of water to perform CSEM surveying.

Figure 12:
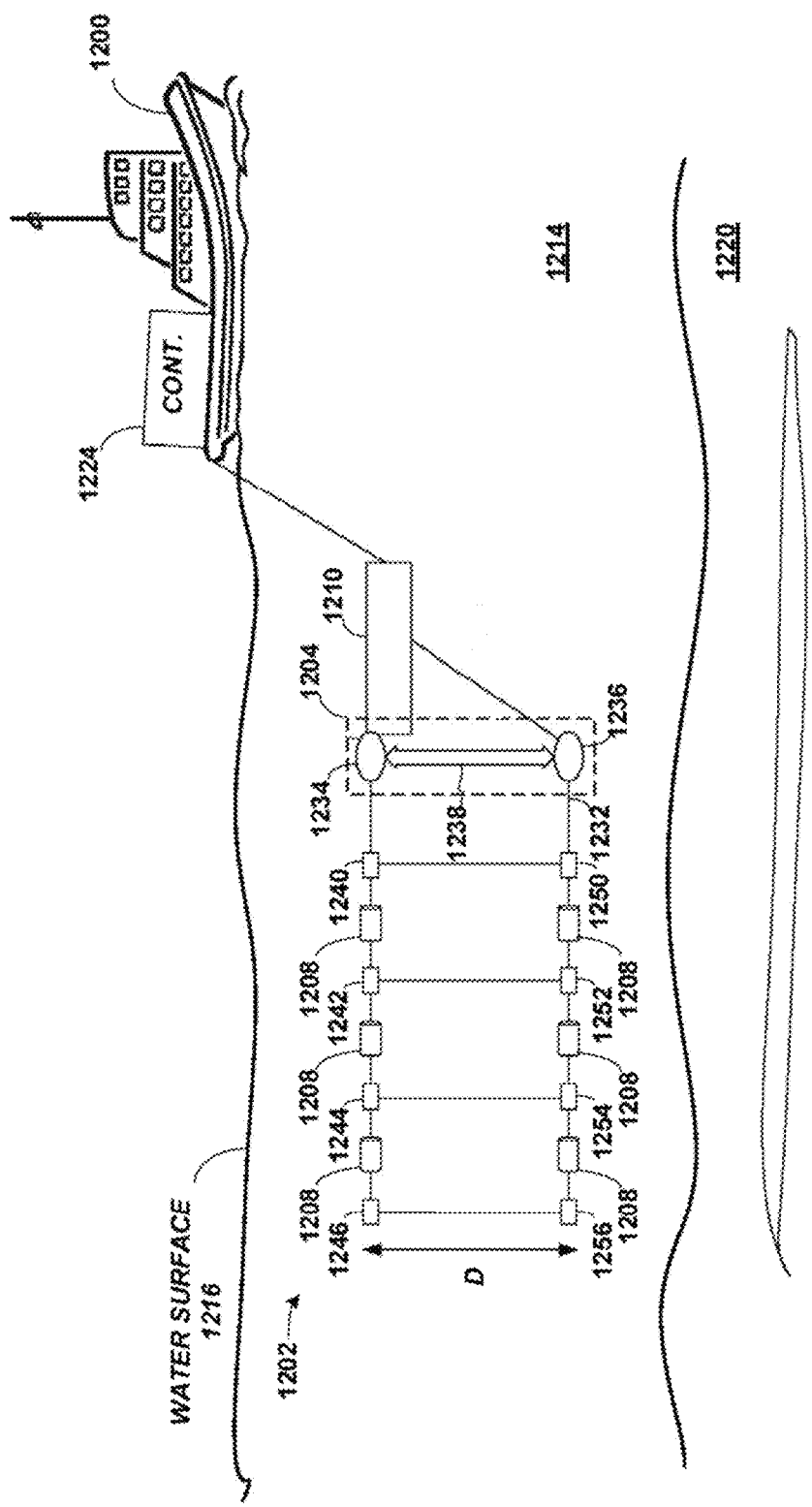
FIG. 12 illustrates a controlled sources electromagnetic survey, according to one particular embodiment.

FIG. 12 shows an exemplary marine survey arrangement that includes a marine vessel 1200 that tows an assembly 1202 of a vertical EM source 1204 (made up of source electrodes 1234 and 1236), electric field receivers (made up of electrodes 1240, 1242, 1244, 1246, 1250, 1252, 1254, and 1256), and magnetometers 1208. The electric field receivers are used to measure electric fields. The magnetometers 1208 (either 1-2-3 components or total field magnetometers) are used to measure magnetic fields. The magnetometers 1208 can be used to measure the magnetic fields at various offsets. The electric field receivers and magnetometers collectively are considered EM receivers (for measuring both electrical and magnetic fields).

The electrical cable 1230 includes a first source electrode 1234, and the cable 1232 includes a second source electrode 1236, where the source electrodes 1234 and 1236 are spaced apart by the distance D. The source electrodes 1234 and 1236 are part of the vertical EM source 1204. The source electrodes 1234 and 1236 are aligned above and below each other such that when a current is passed between them (with the direction of current flow depicted with double arrows 1238), a vertical electric dipole is created.

In operation, as the marine vessel 1200 tows the assembly 1202 through the body of water 1214, the controller 1224 can send commands to the electronic module 1210 to cause activation of the vertical EM source 1204. Activation of the vertical EM source 1204 causes EM fields according to the TM mode to be generated and to be propagated into the subterranean structure 1220. EM signals that are affected by the subterranean structure 1220 are detected by the electric field receivers and the magnetometers 1208 of the assembly 1202. As noted above, the electric field receivers made up of the receiver electrodes 1240, 1242, 1244, 1246, 1250, 1252, 1254, and 1256 measure the electric fields, with receiver electrodes along each cable measuring horizontal electric fields, and two vertically spaced receiver electrodes on respective cables 1230 and 1232 measuring vertical electric fields. Also, the magnetometers 1208 measure magnetic fields.

The multi-vessel coil shoot survey disclosed herein can also be employed in a CSEM survey such as that described above. One example of a CSEM streamer is disclosed and claimed in U.S. application Ser. No. 12/174,179, filed Jul. 15, 2008, incorporated by reference below.

Typical benefits of multivessel coil shooting such as is disclosed herein include:

improved subsurface illumination due to the long offsets (up to 14 km) and full-azimuth data acquired;

near offsets and far offset are acquired from each shot;

improved multiple attenuation due to larger offsets;

improved cost efficiency due to a larger roll interval;

high density data can be acquired by using simultaneous sources; note: if 4 sources are available and all 4 shoot simultaneously the data density is increased 4× vs. sequential shooting;

enables subsalt AVO analysis due to the fact that larger angles of incidence are acquired; note: longer offsets increases the angle of incidence for the subsalt sediments; and easy to undershoot isolated obstructions.

Note that not all embodiments will manifest each of these benefits to the same degree. Indeed, some embodiments may not exhibit all of these benefits, omitting some of them in particular implementations. Conversely, those skilled in the art may appreciate benefits and advantages in addition to those set forth above.

Figure 13A:
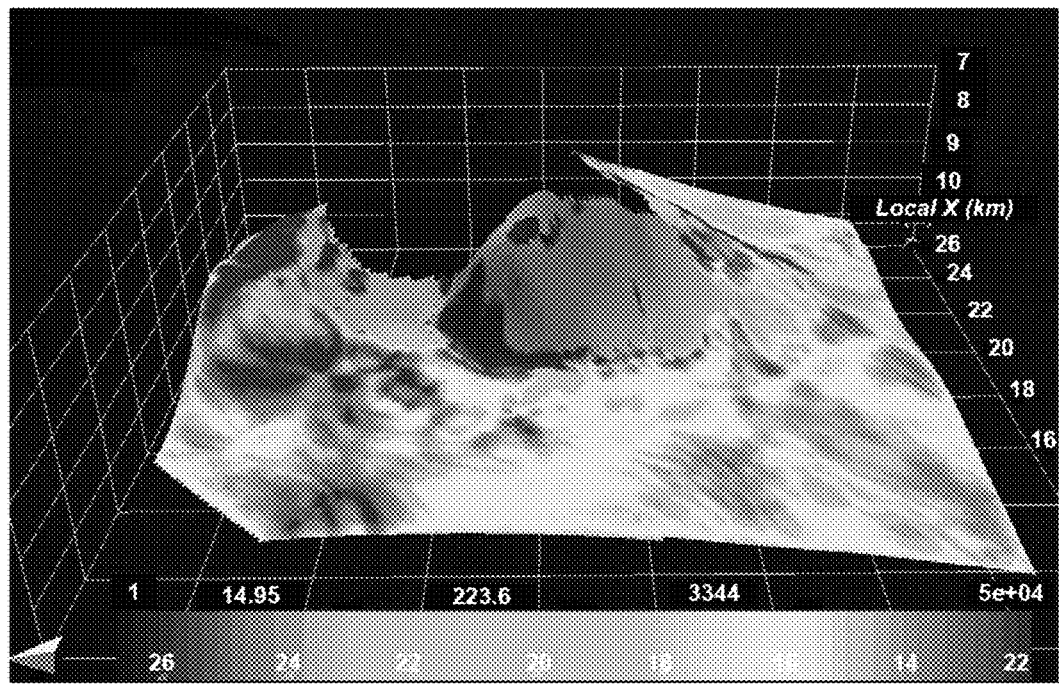
FIG. 13A-FIG. 13B compare the illumination of a steep-dip subsalt reservoir with a two streamer vessel, four source vessel (six sources) wide azimuth parallel geometry acquisition and with a two streamer vessel, four source vessel (six sources) coil shooting acquisition.
Figure 13B:
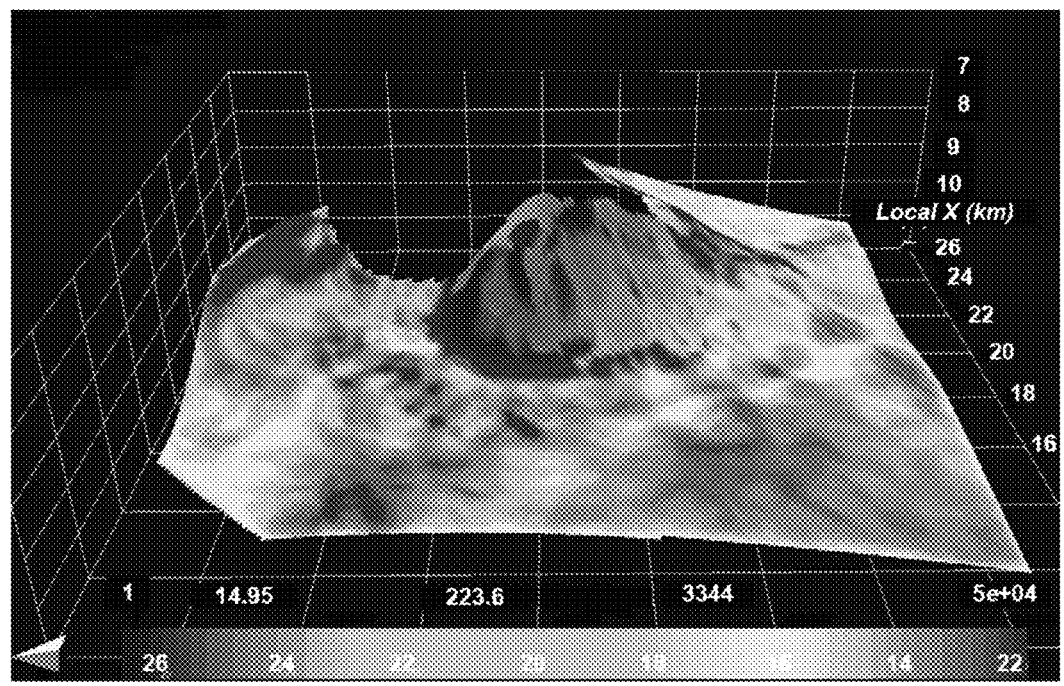

For example, consider FIG. 13A-FIG. 13B. FIG. 13A-FIG. 13B compare the illumination of a steep-dip subsalt reservoir with a two streamer vessel, four source vessel (six sources) wide azimuth parallel geometry acquisition and with a two streamer vessel, four source vessel (six sources) coil shooting acquisition, respectively. That is, FIG. 13B can be acquired using the embodiment of FIG. 1. These drawings are "hit maps," wherein coloration/shading represent the number hits per bin, and were derived based on ray tracing. It could be seem that the illumination of the steep-dip subsalt reservoirs requires long offset and full azimuth data. In FIG. 13A, the maximum offset was 8600 m wherein the maximum offset in FIG. 13B was 14000 m.

Thus, in accordance with the present invention, methods are described for acquiring marine seismic data that may be more cost effective and provide improved seismic imaging compared to presently employed methods. Methods of the invention comprise acquiring wide- or rich-azimuth data using a single streamer vessel (in certain embodiments using a single Q-Technology™ streamer vessel) towing multiple streamer cables using one or more calibrated marine seismic sources (in certain embodiments Q-Marine™ sources), wherein the streamer vessel and the one or more source arrays traverse a generally curved advancing shooting pattern. In certain embodiments one or more source arrays may traverse a smaller or larger curved pattern than the streamer vessel.

As used herein the phrase "generally curved advancing path" means that the vessels and streamers travel generally in a curve, and there is an advancement in one or more of the X and Y directions, as explained further herein. The path may be expressed as a coil. The curve may be circular, oval, elliptical, FIG. 8, or other curved path. Generally, multiple vessels having sources are used in various configurations, for example:

1×3 (one vessel has streamers, three vessels have sources),

2×2 (two vessels total, each have streamers and sources),

2×4 (two vessels have streamers and four have sources).

Those in the art having the benefit of this disclosure will realize additional alternative embodiments by which the invention may be disclosed.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, ¶6 unless "means for" is explicitly recited together with an associated function. "Means for" clauses are intended to cover the structures described herein as performing the recited function and not only structural equivalents, but also equivalent structures.

As used herein, the phrase "capable of" as used herein is a recognition of the fact that some functions described for the various parts of the disclosed apparatus are performed only when the apparatus is powered and/or in operation. Those in the art having the benefit of this disclosure will appreciate that the embodiments illustrated herein include a number of electronic or electro-mechanical parts that, to operate, require electrical power. Even when provided with power, some functions described herein only occur when in operation. Thus, at times, some embodiments of the apparatus of the invention are "capable of" performing the recited functions even when they are not actually performing them—i.e., when there is no power or when they are powered but not in operation.

The following documents are hereby incorporated by reference for the noted teaching as if set forth herein verbatim:

U.S. Pat. No. 4,757,482, entitled, "Modular Airgun Array Method, Apparatus and System," and issued Jul. 12, 1988, to Bolt Technology Corporation, as assignee of the inventor Augustus H. Fiske, Jr. for its teachings seismic source design and construction;

U.S. Pat. No. 6,477,711, entitled, "Method of Making a Marine Seismic Streamer," and issued Nov. 5, 2002, to Schlumberger Technology Corporation, as assignee of the inventors Lunde et al., for its teachings regarding streamer design and construction;

U.S. Pat. No. 6,671,223, entitled, "Control Devices for Controlling the Position of a Marine Seismic Streamer," and issued Dec. 30, 2003, to WesternGeco, LLC, as assignee of the inventor Simon Hastings Bittleston, for its teachings regarding streamer design and construction as well as its teachings about spread control;

U.S. Pat. No. 6,684,160, entitled, "Marine Seismic Acquisition System and Method," and issued Jan. 27, 2004, to WesternGeco, LLC, as assignee of the inventors Ösbek et al., for its teachings regarding streamer design and construction;

U.S. Pat. No. 6,932,017, entitled, "Control System for Positioning of Marine Seismic Streamers," and issued Aug. 23, 2005, to WesternGeco, LLC, as assignee of the inventors Øyvind Hillesund and Simon Bittleston for its teachings regarding streamer design and construction as well as its teachings about spread control;

U.S. Pat. No. 7,080,607, entitled, "Seismic Data Acquisition Equipment Control System," and issued Jul. 25, 2006, to WesternGeco LLC, as assignee of the inventors Øyvind Hillesund and Simon Bittleston for its teachings regarding streamer design and construction as well as its teachings about spread control;

U.S. Pat. No. 7,293,520, entitled, "Control System for Positioning of Marine Seismic Streamers," and issued Nov. 13, 2007, to WesternGeco LLC, as assignee of the inventors Øyvind Hillesund and Simon Bittleston for its teachings regarding streamer design and construction as well as its teachings about spread control;

U.S. application Ser. No. 11/114,773, entitled, "Seismic Streamer System and Method," and filed Apr. 26, 2005, in the name of the inventors Singh et al. for its teachings regarding multicomponent streamer design, construction and operation;

U.S. application Ser. No. 11/335,365, entitled, "Methods and Systems for Efficiently Acquiring Towed Streamer Seismic Surveys," and filed Jan. 19, 2006, in the name of the inventors Nicolae Moldoveanu and Steven Fealy for its teachings regarding the design of circular, coil shoot sail lines;

U.S. application Ser. No. 12/351,156, entitled, "Acquiring Azimuth Rich Seismic Data in the Marine Environment Using a Regular Sparse Pattern of Continuously Curved Sail Lines," and filed Jan. 9, 2009, in the name of the inventors Hill et al., (53.0097/2086.00600) for its teachings regarding the design of circular, coil shoot sail lines;

U.S. application Ser. No. 12/121,324, entitled "Methods for Efficiently Acquiring Wide-Azimuth Towed Streamer Seismic Data," and filed on May 15, 2008, in the name of the inventors Nicolae Moldoveanu and Steven Fealy for its teachings regarding the design of circular, coil shoot sail lines; and U.S. application Ser. No. 12/174,179, entitled "Surveying Using Vertical Electromagnetic Sources that are Towed Along with Survey Receivers," and filed on Jul. 15, 2008, in the name of the inventors Alumbaugh et al., for its teachings regarding CSEM surveys; and U.S. Provisional Patent Application Ser. No. 61/180,154, entitled "Multi-Vessel Coil Shooting Acquisition," and filed May 21, 2009, in the name of the inventors Nicolae Moldoveanu and Steven Fealy, for all its teachings;

U.S. Provisional Patent Application Ser. No. 61/218,346, entitled "Multi-Vessel Coil Shooting Acquisition," and filed Jun. 18, 2009, in the name of the inventors Nicolae Moldoveanu and Steven Fealy, for all its teachings;

Beasley, C, J & R. E., Chambers, 1998, "A New Look at Simultaneous Sources," 60$^{th}$ Conference and Exhibition, EAGE, Extended Abstracts, 02-38, for its teachings regarding source separation techniques.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A marine seismic acquisition system, comprising:
a first vessel towing a streamer, wherein the first vessel is configured to travel along a first coil path;
three or more source only vessels, wherein respective source only vessels of the three or more source only vessels are configured to travel along a plurality of coil paths; and
one or more controllers programmed to conduct a multivessel coil shoot using the first vessel and the three or more source only vessels;
wherein respective coil paths in the plurality of coil paths are different.

2. The marine seismic acquisition system of claim 1, wherein the first coil path and the plurality of coil paths are substantially equivalent.

3. The marine seismic acquisition system of claim 1, wherein the first coil path and at least one of the plurality of coil paths are different.

4. The marine seismic acquisition system of claim 1, wherein the multivessel coil shoot collects full azimuth seismic data.

5. A marine seismic acquisition system, comprising:
a first vessel towing a streamer, wherein the first vessel is configured to travel along a first coil path;
a plurality of source vessels, wherein respective source vessels in the plurality of source vessels are configured to travel along one or more coil paths; and
one or more controllers programmed to conduct a multivessel coil shoot using the first vessel and the plurality of source vessels;
wherein an offset between the first vessel and at least one vessel in the plurality of source vessels is greater than 8600 meters.

6. A marine seismic acquisition system, comprising:
a first vessel towing a streamer, wherein the first vessel is configured to travel along a first coil path;
a plurality of source vessels, wherein respective source vessels in the plurality of source vessels are configured to travel along one or more coil paths; and
one or more controllers programmed to conduct a multivessel coil shoot using the first vessel and the plurality of source vessels;
wherein:
there is a first offset between the first vessel and a first source vessel in the plurality of source vessels; and
there is a second offset between the first vessel and a second source vessel in the plurality of source vessels.

7. The marine seismic acquisition system of claim 6, wherein the first offset and the second offset are substantially equivalent.

8. The marine seismic acquisition system of claim 6, wherein the first offset and the second offset are different.

9. A method, comprising:
towing a streamer with a first vessel along a first coil path;
towing three or more sources separate from the first vessel along a plurality of coil paths; and
conducting a multivessel coil shoot with the first vessel and the three or more sources;
wherein respective coil paths in the plurality of coil paths are different.

10. The method of claim 9, wherein the first coil path and the plurality of coil paths are substantially equivalent.

11. The method of claim 9, wherein the first coil path and at least one of the plurality of coil paths are different.

12. The method of claim 9, wherein the multivessel coil shoot collects full azimuth seismic data.

13. A method, comprising:
towing a streamer with a first vessel along a first coil path;
towing a plurality of sources along one or more coil paths; and
conducting a multivessel coil shoot with the first vessel and the plurality of sources;
wherein a first source in the plurality of sources and a second source in the plurality of sources have different offsets from the streamer.

14. A method, comprising:
towing a streamer with a first vessel along a first coil path;
towing a plurality of sources along one or more coil paths; and
conducting a multivessel coil shoot with the first vessel and the plurality of sources;

wherein an offset between the streamer and at least one source in the plurality of sources exceeds 12 kilometers.

15. A method, comprising:

towing a streamer with a first vessel along a first curved path;

towing three or more sources separate from the first vessel along a plurality of curved paths; and conducting a multivessel coil shoot with the first vessel and the three or more sources;

wherein respective curved paths in the plurality of curved paths are different.

16. The method of claim 15, wherein the first curved path and the plurality of curved paths are substantially the same.

17. The method of claim 15, wherein the first curved path and the plurality of curved paths are different.

18. The method of claim 15, wherein the multivessel coil shoot collects full azimuth seismic data.

* * * * *